(12) United States Patent
Shin

(10) Patent No.: US 11,798,268 B2
(45) Date of Patent: Oct. 24, 2023

(54) METHOD FOR IMPROVING RELIABILITY OF ARTIFICIAL INTELLIGENCE-BASED OBJECT RECOGNITION USING COLLECTIVE INTELLIGENCE-BASED MUTUAL VERIFICATION

(71) Applicant: OGQ CORPORATION, Seoul (KR)

(72) Inventor: Cheol Ho Shin, Seoul (KR)

( * ) Notice: Subject to any disclaimer, the term of this patent is extended or adjusted under 35 U.S.C. 154(b) by 204 days.

(21) Appl. No.: 17/419,784

(22) PCT Filed: Dec. 9, 2019

(86) PCT No.: PCT/KR2019/017310
§ 371 (c)(1),
(2) Date: Jun. 30, 2021

(87) PCT Pub. No.: WO2020/141745
PCT Pub. Date: Jul. 9, 2020

(65) Prior Publication Data
US 2022/0084311 A1 Mar. 17, 2022

(30) Foreign Application Priority Data
Dec. 31, 2018 (KR) ........................ 10-2018-0173896

(51) Int. Cl.
*G06V 10/778* (2022.01)
*G06V 10/20* (2022.01)

(52) U.S. Cl.
CPC ........ *G06V 10/7792* (2022.01); *G06V 10/255* (2022.01)

(58) Field of Classification Search
CPC ............. G06V 10/7792; G06V 10/255; G06V 10/778; G06V 10/95; G06V 2201/10; G06V 40/178; G06N 20/00
See application file for complete search history.

(56) References Cited

U.S. PATENT DOCUMENTS 8,606,745 B1 * 12/2013 Haveliwala ............ G06Q 30/02
707/602
9,495,614 B1 * 11/2016 Boman .................. G06F 16/29
(Continued)

FOREIGN PATENT DOCUMENTS

KR 10-1797856 B1 11/2017
KR 10-2018-0041699 A 4/2018
(Continued)

OTHER PUBLICATIONS

Rosenfeld et al, Challenging Images for Minds and Machines, 2018, arXiv: 1802.04834v1, pp. 1-7. (Year: 2018).*
(Continued)

*Primary Examiner* — John Villecco
*Assistant Examiner* — Kathleen M Broughton

(57) ABSTRACT

Provided is a method for improving reliability of artificial intelligence-based object recognition, in which: in a server interworking with an artificial intelligence module, one or more object regions included in learning data including an image of a recognition target object to be recognized through the artificial intelligence module are recognized; object region recognition data which sets the recognized object regions is extracted and is provided to user terminals in a designated order; a procedure for receiving, from the user terminals, object region selection data which selects at least one effective object region corresponding to the recognition target object among object regions included in the object region recognition data is performed; and the object region selection data of respective users received from the user terminals is mutually compared and analyzed by the same object region selection data.

14 Claims, 9 Drawing Sheets

(56) References Cited

U.S. PATENT DOCUMENTS

2017/0161477 A1* 6/2017 Liu .................. G06F 21/36
2018/0107684 A1* 4/2018 Kiapour ............ G06N 3/045
2018/0336415 A1* 11/2018 Anorga ............. G06F 16/50

FOREIGN PATENT DOCUMENTS

KR      10-1854804 B1    5/2018
KR   10-2018-0130925 A   12/2018

OTHER PUBLICATIONS

Nguyen et al, Deep Neural Networks are Easily Fooled: High Confidence Predictions for Unrecognizable Images, arXiv: 1412.1897v1, pp. 1-10. (Year: 2015).*
International Search Report for PCT/KR2019/017310 dated Mar. 23, 2020.

* cited by examiner

[FIG.1]
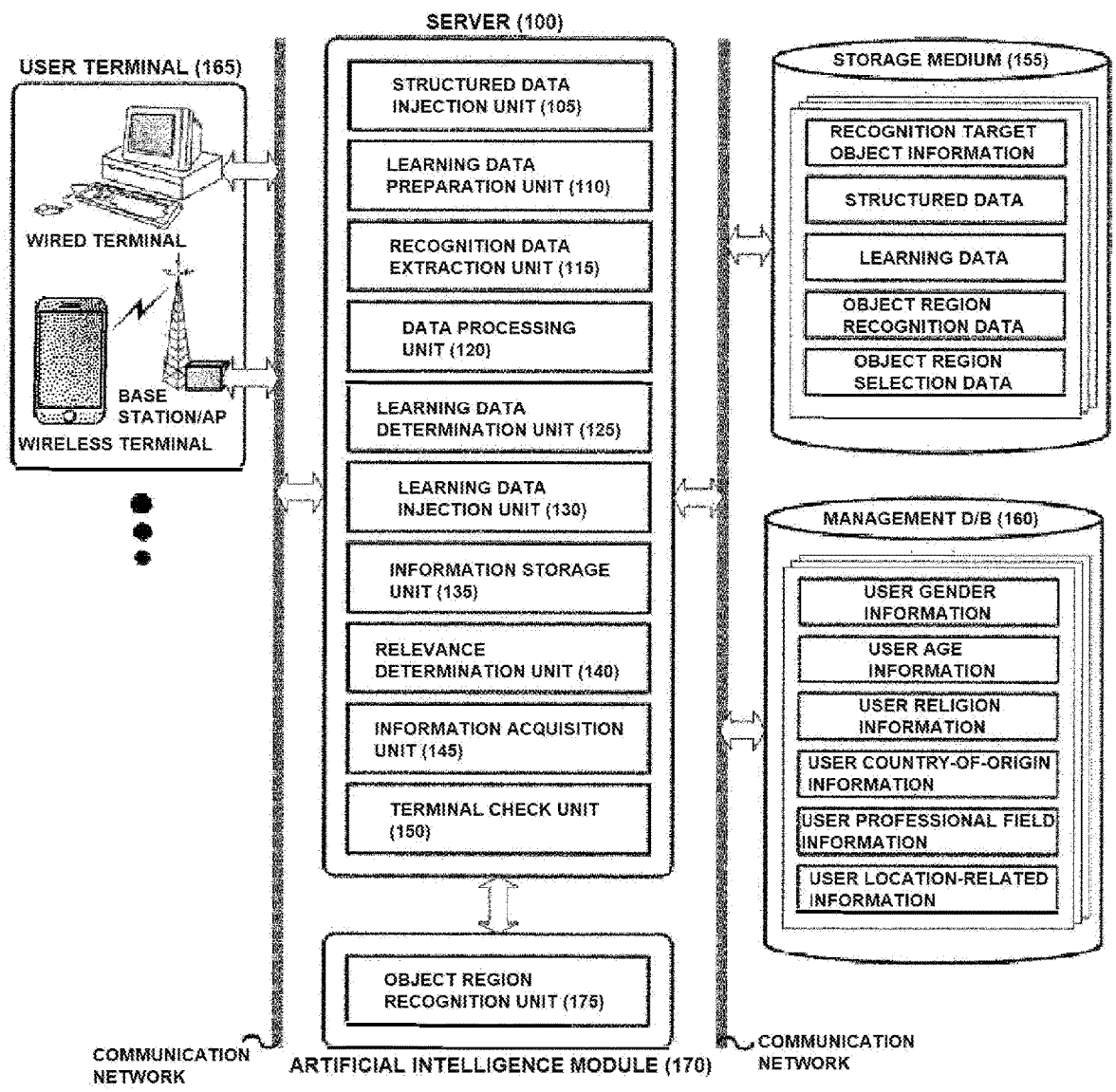

[FIG.2]
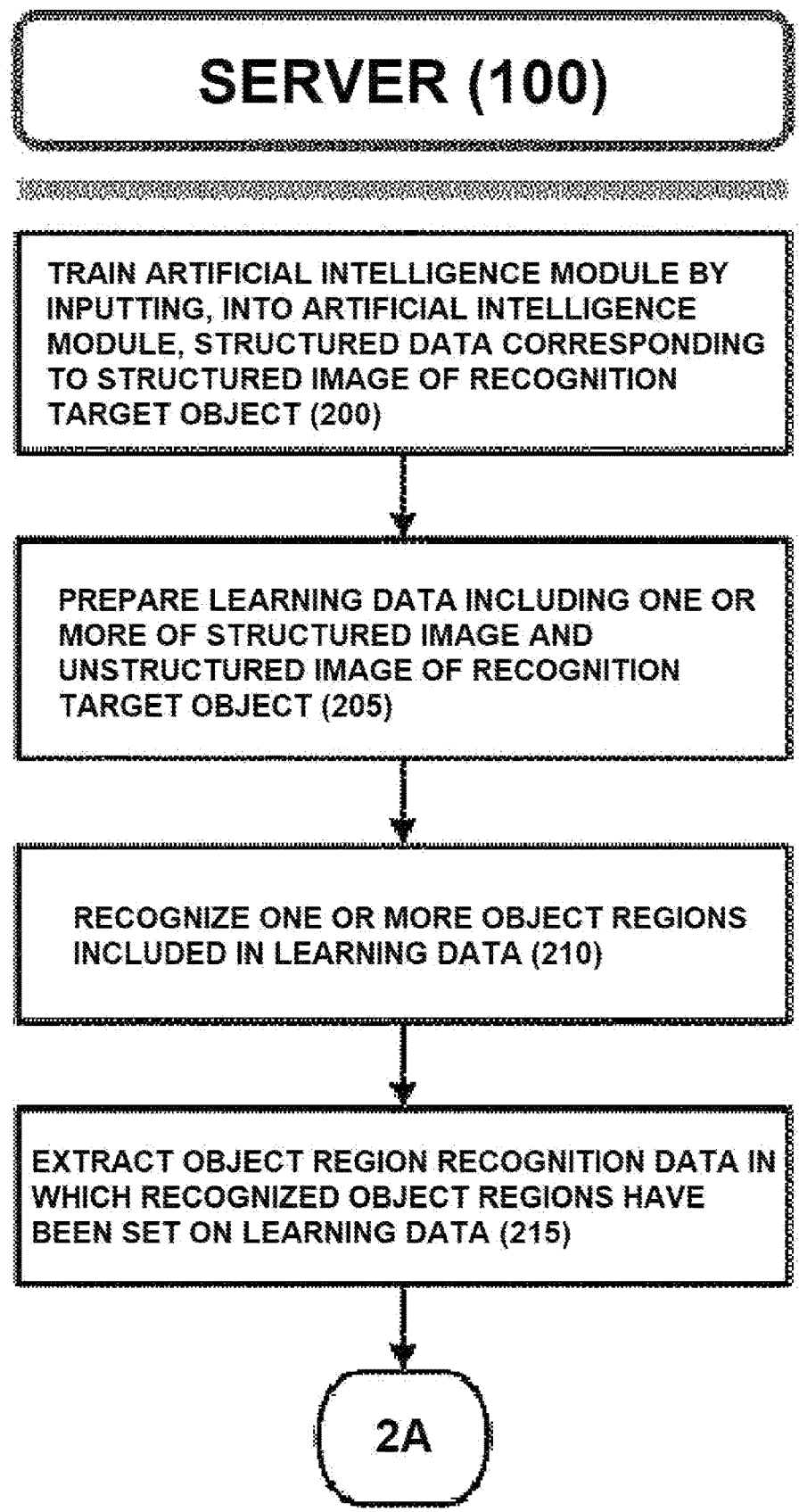

[FIG.3a]
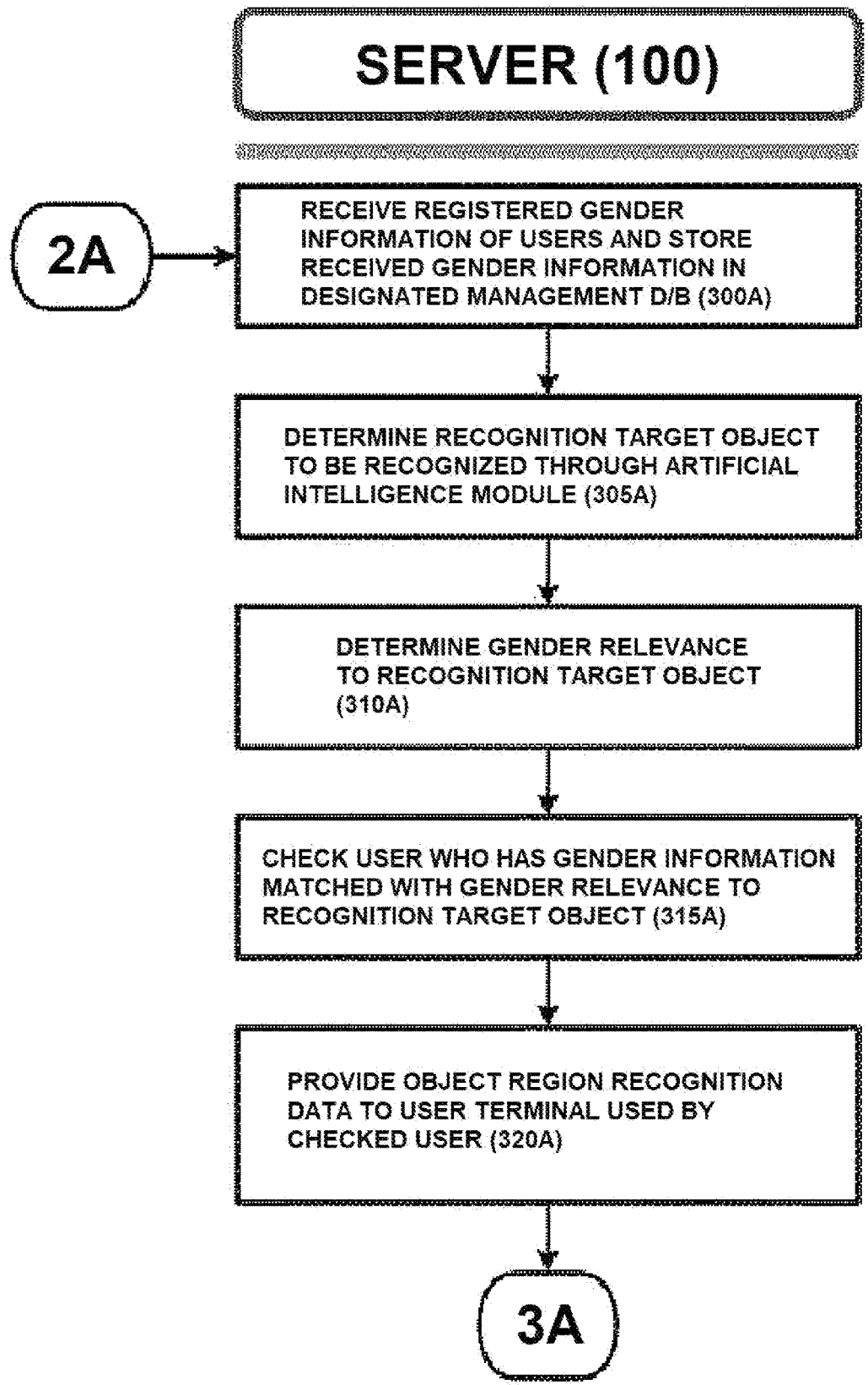

[FIG.3b]
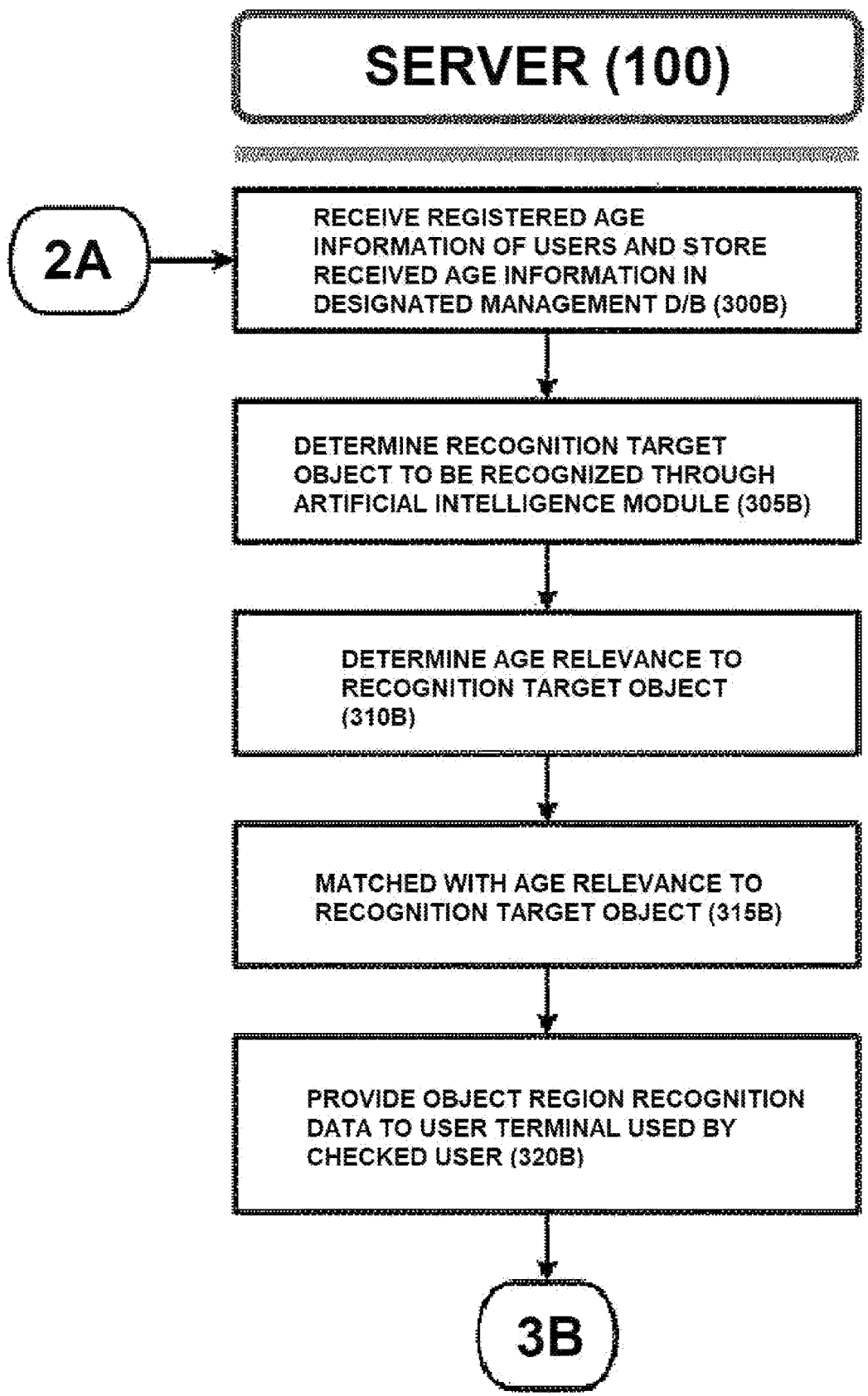

[FIG.3c]
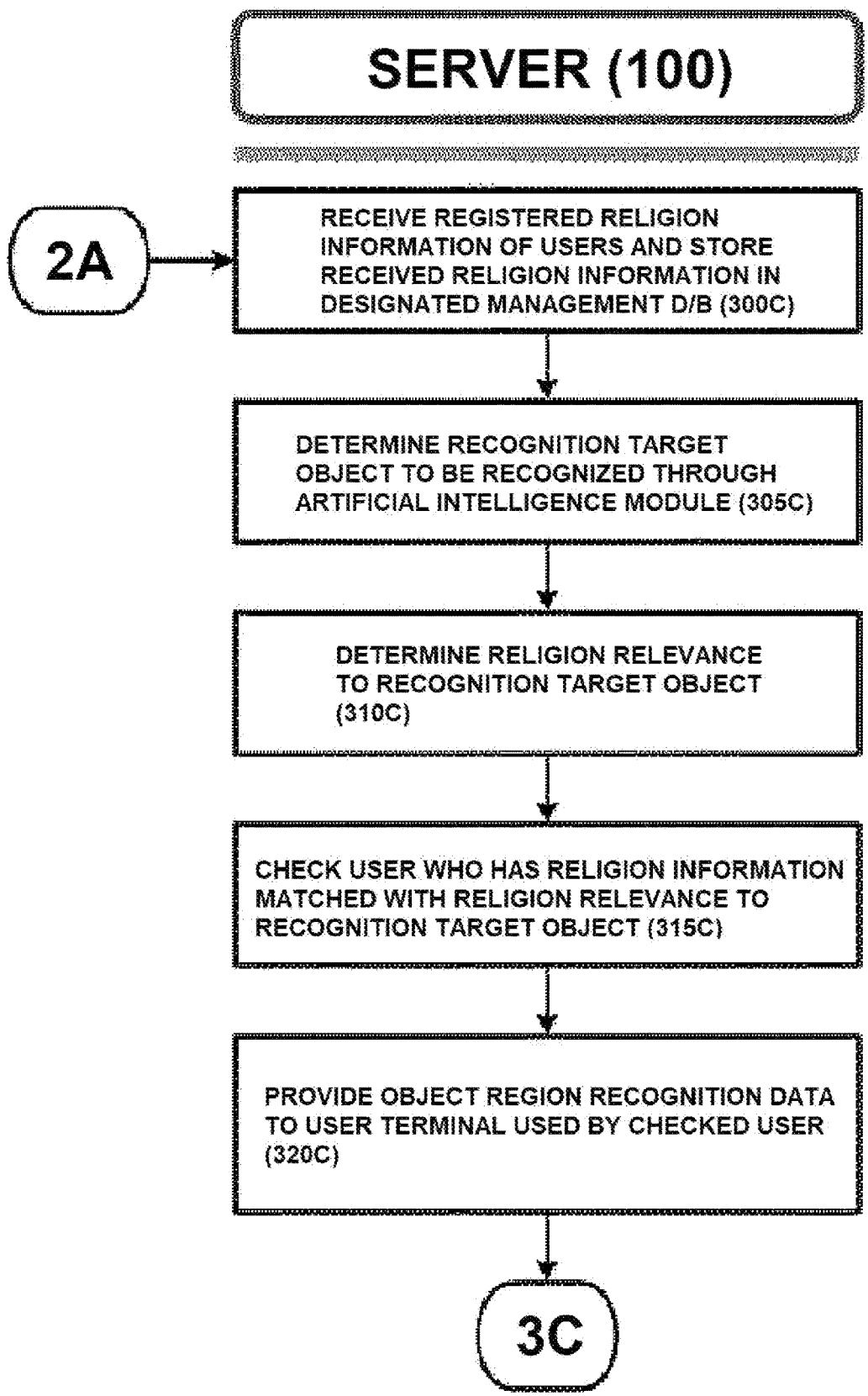

[FIG.3d]
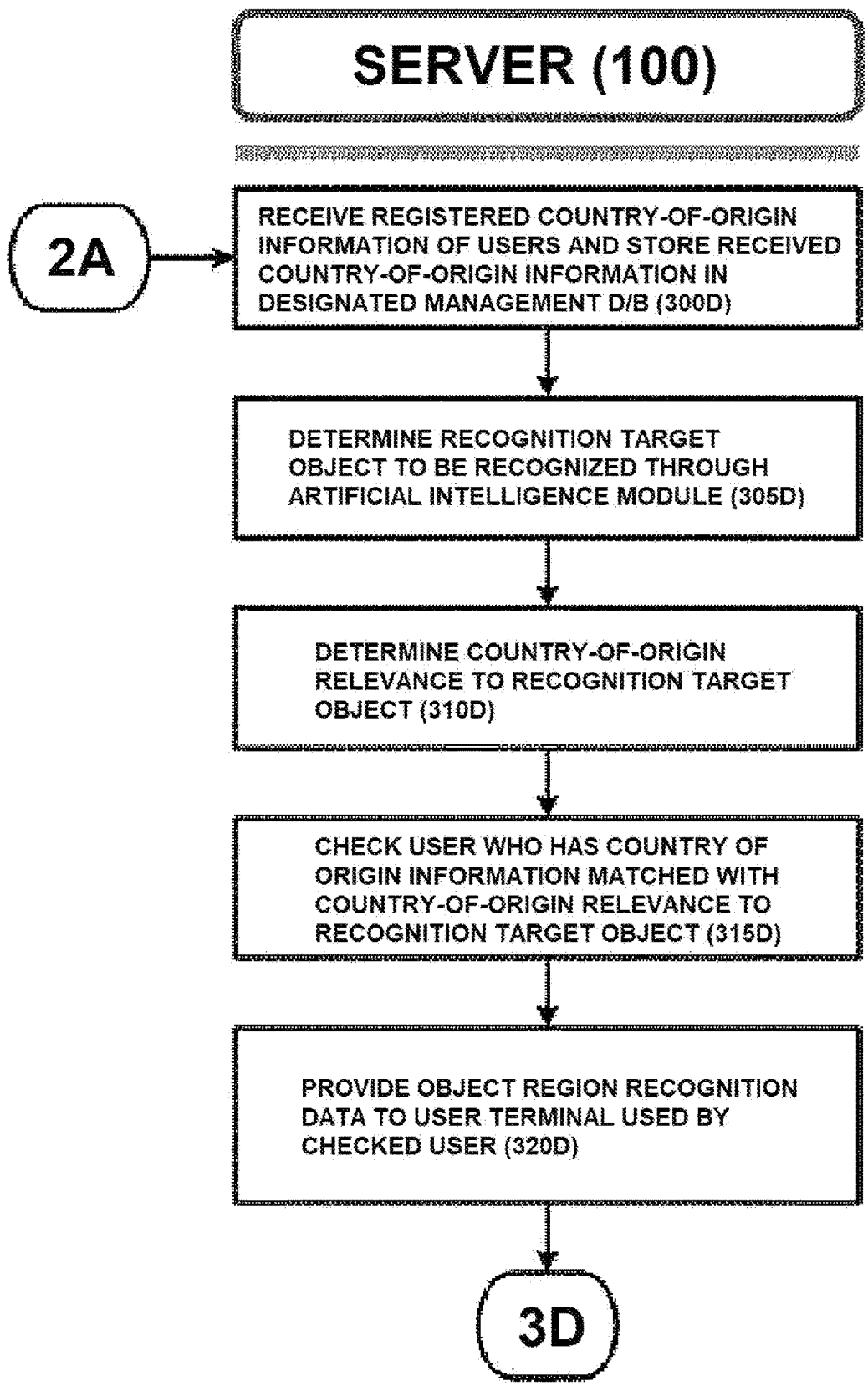

[FIG.3e]
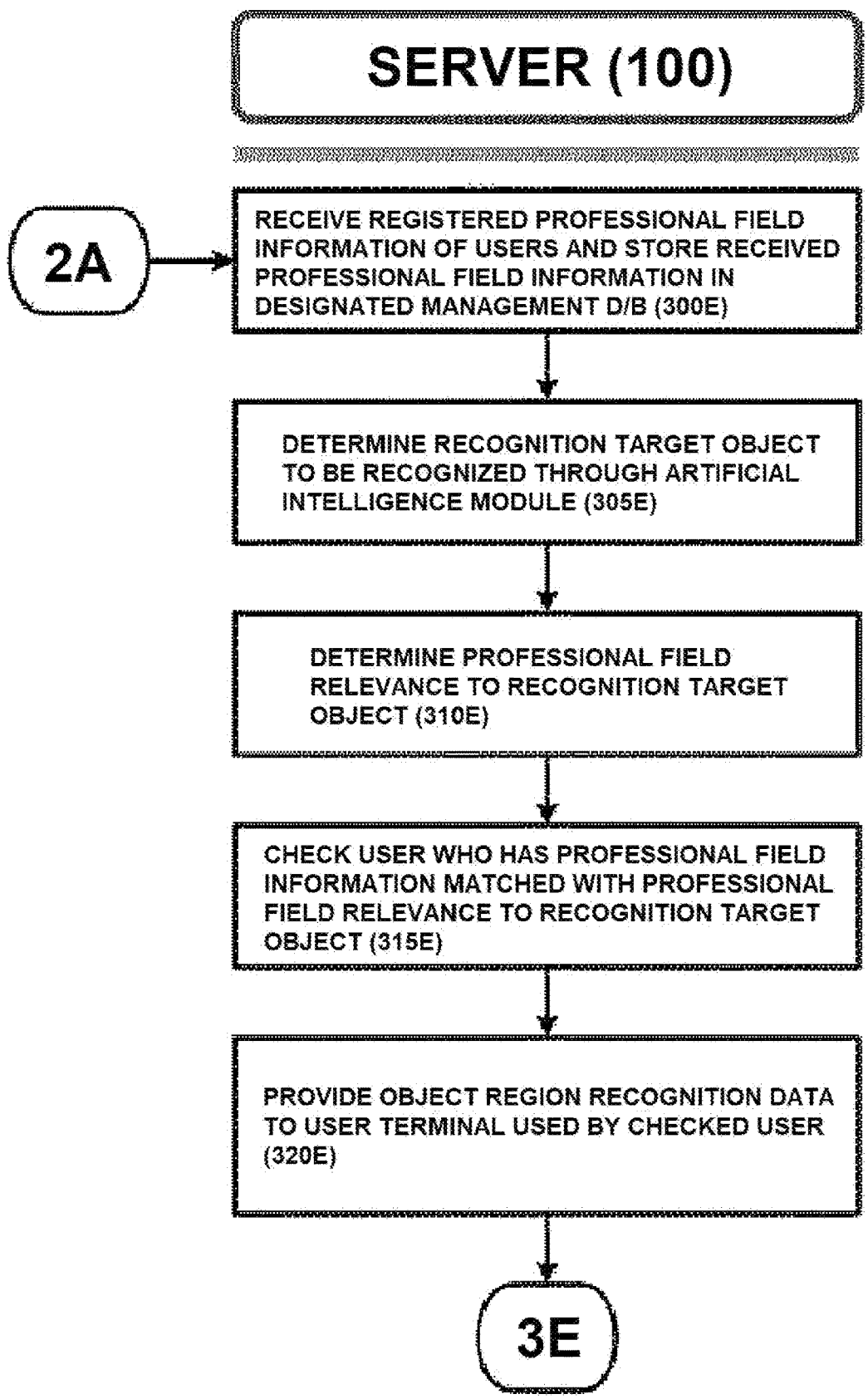

[FIG.4]
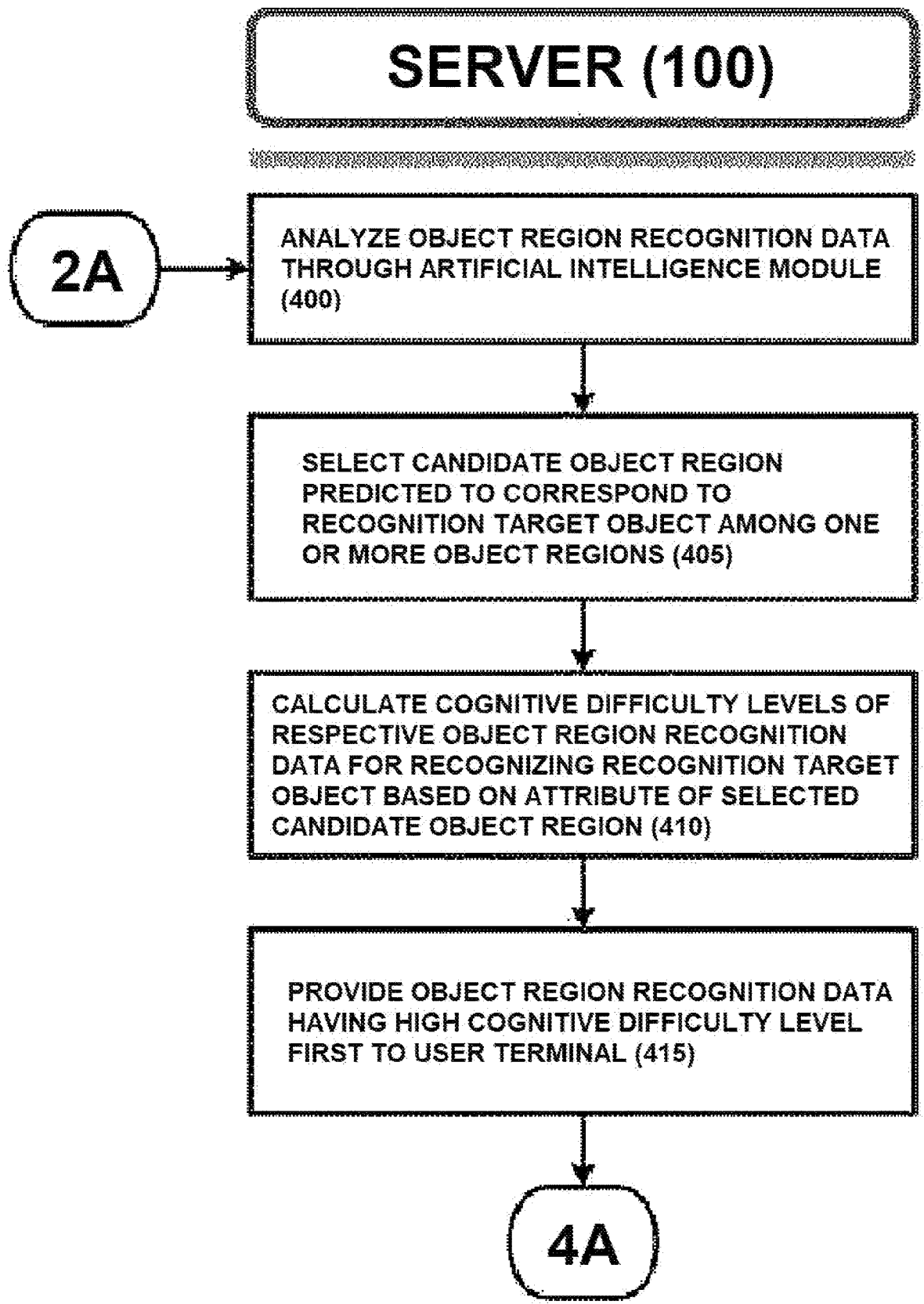

[FIG.5]
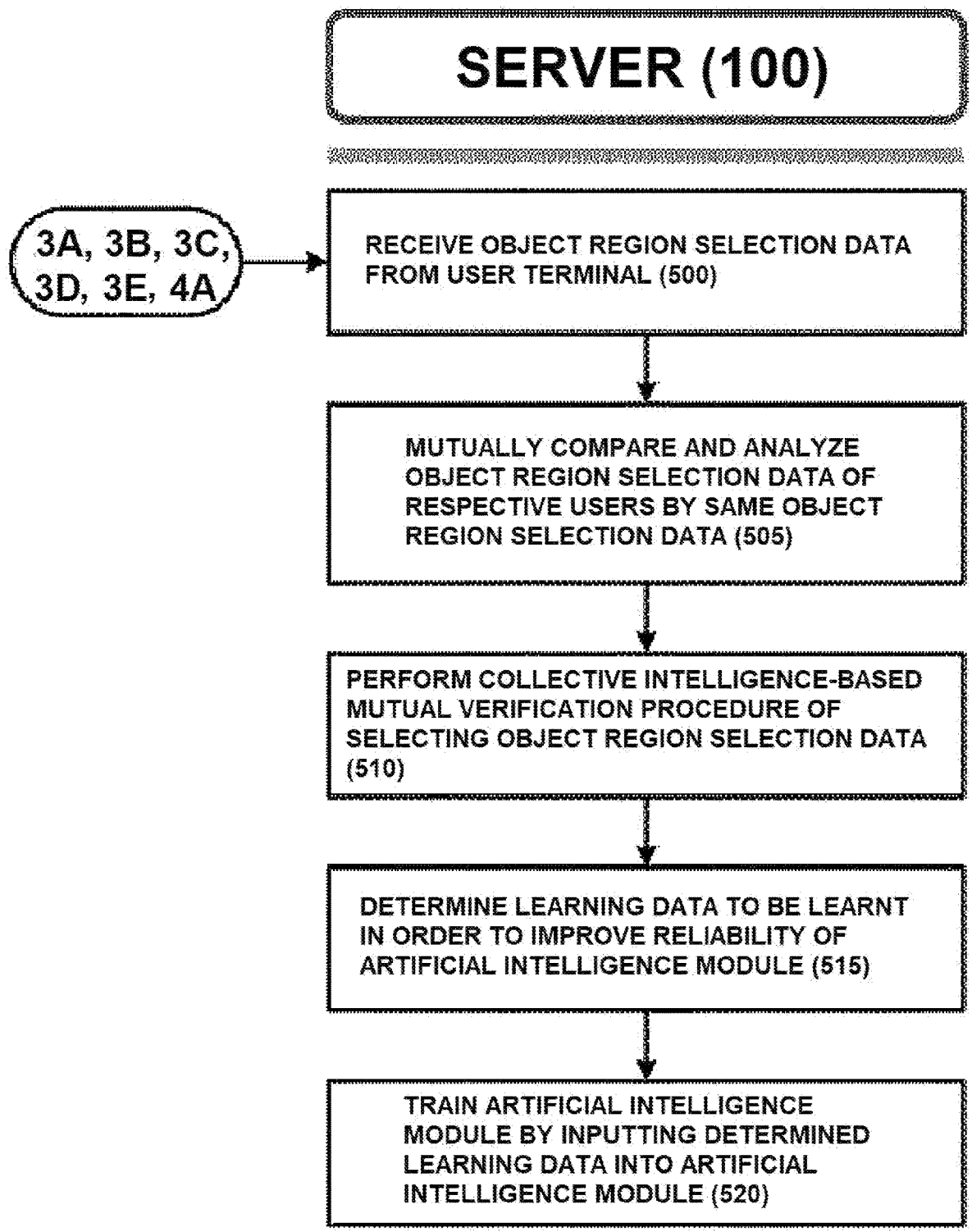

METHOD FOR IMPROVING RELIABILITY OF ARTIFICIAL INTELLIGENCE-BASED OBJECT RECOGNITION USING COLLECTIVE INTELLIGENCE-BASED MUTUAL VERIFICATION

TECHNICAL FIELD

The present disclosure relates to a method of improving reliability of artificial intelligence-based object recognition using collective intelligence-based mutual verification, the method including: recognizing, by a server operating in conjunction with an artificial intelligence module, one or more object regions included in learning data including a structured image or unstructured image of a recognition target object to be recognized through the artificial intelligence module; extracting object region recognition data in which the recognized object regions have been set; determining learning data, which are to be input to and learnt by the artificial intelligence module in order to improve reliability of the artificial intelligence module, by performing, for a given time, a procedure of providing the extracted object region recognition data to one or more user terminals in a designated order and receiving, from the user terminals, object region selection data including at least one effective object region corresponding to the recognition target object and selected among the one or more object regions included in the object region recognition data and by performing a collective intelligence-based mutual verification procedure of selecting object region selection data including the same effective object region selected by a designated ratio or more of users among users who have selected the effective object regions for each object region selection data by mutually comparing and analyzing the object region selection data of respective users, received from the user terminals, for each identical object region selection data; and training the artificial intelligence module by inputting the determined learning data to the artificial intelligence module.

BACKGROUND ART

In order to make a machine to recognize an object in a common deep learning technology, researchers or developers use a method of continuously learning, by a machine, an object to be recognized. For example, in order to make a machine learn an "electric lamp" so that the machine recognizes the electric lamp, in general, the researchers make the machine learn the electric lamp in a way that the machine learns various forms of electric lamps and learns several thousands of photos including electric lamps and an error is corrected based on the learning results.

However, such a method is inevitably a very hard task that must be continuously repeated whenever the type of object to be recognized is increased. It is time for a better scheme for solving such a method.

DISCLOSURE

Technical Problem

An object of the present disclosure for solving the problem is to provide a method of improving reliability of artificial intelligence-based object recognition using collective intelligence-based mutual verification, the method including, by a server operating in conjunction with an artificial intelligence module, training the artificial intelligence module by inputting, to the artificial intelligence module, M ($M \geq 2$) structured data corresponding to a structured image of a recognition target object to be recognized through the artificial intelligence module, preparing N ($N \leq 2$) learning data including one or more of the structured image and unstructured image of the recognition target object, recognizing one or more object regions included in the N learning data and extracting N object region recognition data in which the recognized object regions have been set on the N learning data, performing, on designated u ($1 \leq u \leq U$) users for a given time, a procedure of providing, in a designated order, ni ($1 \leq ni \leq N$) object region recognition data to an i-th user terminal used by an i-th ($1 \leq i \leq U$) user among U ($U \geq 2$) users and receiving, from the i-th user terminal, ni object region selection data including at least one effective object region corresponding to the recognition target object and selected among one or more object regions included in the ni object region recognition data, and a procedure of providing, in a designated order, nj ($1 \leq nj \leq$) object region recognition data to a j-th user terminal used by a j-th ($1 \leq j \leq U$, $i \neq j$) user and receiving, from the j-th user terminal, nj object region selection data including at least one effective object region corresponding to the recognition target object and selected among one or more object regions included in the nj object region recognition data, determining n learning data, which are to be input to and learnt by the artificial intelligence module in order to improve reliability of the artificial intelligence module, by performing a collective intelligence-based mutual verification procedure of selecting n ($1 \leq n \leq N$) object region selection data including an identical effective object region selected by a designated ratio or more of users among v ($1 \leq v \leq u$) users who have selected effective object regions for each object region selection data by mutually comparing and analyzing the object region selection data of respective u users, received from the u user terminals, for each identical object region selection data, and training the artificial intelligence module by inputting the determined n learning data to the artificial intelligence module.

Technical Solution

A method of improving reliability of artificial intelligence-based object recognition using collective intelligence-based mutual verification according to the present disclosure is executed by a server operating in conjunction with an artificial intelligence module and includes: a first step of training the artificial intelligence module by inputting, to the artificial intelligence module, M ($M \geq 2$) structured data corresponding to a structured image of a recognition target object to be recognized through the artificial intelligence module; a second step of preparing N ($N \geq 2$) learning data including one or more of the structured image and unstructured image of the recognition target object; a third step of recognizing one or more object regions included in the N learning data and extracting N object region recognition data in which the recognized object regions have been set on the N learning data; a fourth step of performing, on designated u ($1 \leq u \leq U$) users for a given time, a procedure of providing, in a designated order, ni ($1 \leq ni \leq N$) object region recognition data to an i-th user terminal used by an i-th ($1 \leq i \leq U$) user among U ($U \geq 2$) users and receiving, from the i-th user terminal, ni object region selection data including at least one effective object region corresponding to the recognition target object and selected among one or more object regions included in the ni object region recognition data, and a procedure of providing, in a designated order, nj ($1 \leq nj \leq N$) object region recognition data to a j-th user terminal used by a j-th (1≤j≤U, i≠j) user and receiving, from the j-th user terminal, nj object region selection data including at least one effective object region corresponding to the recognition target object and selected among one or more object regions included in the nj object region recognition data; a fifth step of determining n learning data, which are to be input to and learnt by the artificial intelligence module in order to improve reliability of the artificial intelligence module, by performing a collective intelligence-based mutual verification procedure of selecting n (1≤n≤N) object region selection data including an identical effective object region selected by a designated ratio or more of users among v (1≤v≤u) users who have selected effective object regions for each object region selection data by mutually comparing and analyzing the object region selection data of respective u users, received from the u user terminals, for each identical object region selection data; and a sixth step of training the artificial intelligence module by inputting the determined n learning data to the artificial intelligence module.

In the method of improving reliability of artificial intelligence-based object recognition using collective intelligence-based mutual verification according to the present disclosure, the third step may include a step of extracting N object region recognition data in which one or more object regions recognized through a designated object region recognition algorithm have been set on the N learning data by substituting the N learning data into the object region recognition algorithm, or extracting N object region recognition data in which one or more object regions recognized through an object region recognition unit of the artificial intelligence module which has learnt the M structured data have been set on the N learning data by substituting the N learning data into the object region recognition unit, or extracting N object region recognition data in which one or more object regions recognized through an object region recognition algorithm equivalent to the object region recognition unit of the artificial intelligence module have been set on the N learning data by substituting the N learning data into the object region recognition algorithm.

In the method of improving reliability of artificial intelligence-based object recognition using collective intelligence-based mutual verification according to the present disclosure, the ni object region recognition data may include object region recognition data provided in order different from order of object region recognition data included in the nj object region recognition data, may not include one or more of the object region recognition data included in the nj object region recognition data, or may include one or more of object region recognition data not included in the nj object region recognition data.

The method of improving reliability of artificial intelligence-based object recognition using collective intelligence-based mutual verification according to the present disclosure may further include steps of: receiving registered gender information of the U users and storing the received gender information in a designated management DB; and determining gender relevance to a recognition target object to be recognized through the artificial intelligence module if the recognition target object is determined, wherein the fourth step includes a step of controlling a designated number of object region recognition data to be provided in a designated order to a user terminal used by a user who has gender information matched with the gender relevance to the recognition target object among the U users.

The method of improving reliability of artificial intelligence-based object recognition using collective intelligence-based mutual verification according to the present disclosure may further include steps of: receiving registered age information of the U users and storing the received age information in a designated management DB; and determining age relevance to a recognition target object to be recognized through the artificial intelligence module if the recognition target object is determined, wherein the fourth step includes a step of controlling a designated number of object region recognition data to be provided in a designated order to a user terminal used by a user who has age information matched with the age relevance to the recognition target object among the U users.

The method of improving reliability of artificial intelligence-based object recognition using collective intelligence-based mutual verification according to the present disclosure may further include steps of: receiving registered religion information of the U users and storing the received religion information in a designated management DB; and determining religion relevance to a recognition target object to be recognized through the artificial intelligence module if the recognition target object is determined, wherein the fourth step includes a step of controlling a designated number of object region recognition data to be provided in a designated order to a user terminal used by a user who has religion information matched with the religion relevance to the recognition target object among the U users.

The method of improving reliability of artificial intelligence-based object recognition using collective intelligence-based mutual verification according to the present disclosure may further include steps of: receiving registered national origin information of the U users and storing the received national origin information in a designated management DB; and determining national origin relevance to a recognition target object to be recognized through the artificial intelligence module if the recognition target object is determined, wherein the fourth step includes a step of controlling a designated number of object region recognition data to be provided in a designated order to a user terminal used by a user who has country of origin information matched with the national origin relevance to the recognition target object among the U users.

The method of improving reliability of artificial intelligence-based object recognition using collective intelligence-based mutual verification according to the present disclosure may further include steps of: receiving registered professional field information of the U users and storing the received professional field information in a designated management DB; and determining professional field relevance to a recognition target object to be recognized through the artificial intelligence module if the recognition target object is determined, wherein the fourth step includes a step of controlling a designated number of object region recognition data to be provided in a designated order to a user terminal used by a user who has professional field information matched with the professional field relevance to the recognition target object among the U users.

The method of improving reliability of artificial intelligence-based object recognition using collective intelligence-based mutual verification according to the present disclosure may further include steps of: obtaining at least one piece of location-related information among pieces of information on a country, an area and a location where a user terminal accessed over a communication network is placed; and checking two or more user terminals, belonging to a designated boundary range or distance range, by reading the location-related information of user terminals accessed in an identical time zone, wherein the fourth step includes a step of controlling object region recognition data of different recognition target objects to be provided, in a designated order, to two or more user terminals belonging to the designated boundary range or distance range, if the two or more user terminals are checked.

The method of improving reliability of artificial intelligence-based object recognition using collective intelligence-based mutual verification according to the present disclosure may further include steps of: obtaining at least one piece of location-related information among pieces of information on a country, an area and a location where a user terminal accessed over a communication network is placed; and checking two or more user terminals, belonging to a designated boundary range or distance range, by reading location-related information of user terminals which are to be provided with object region recognition data of an identical recognition target object in an identical time zone, wherein the fourth step includes a step of controlling the object region recognition data of the recognition target object to be provided in different orders in which the object region recognition data does not overlap to two or more user terminals belonging to a designated boundary range or distance range, if the two or more user terminals are checked.

The method of improving reliability of artificial intelligence-based object recognition using collective intelligence-based mutual verification according to the present disclosure may further include steps of: selecting at least one candidate object region predicted to correspond to the recognition target object, among the one or more object regions included in the N object region recognition data, by analyzing the N object region recognition data through the artificial intelligence module; and calculating cognitive difficulty levels of the respective N object region recognition data for recognizing the recognition target object through a human vision, based on at least one or a combination of two or more among a size of the selected candidate object region (or a size of an object within the candidate object region), resolution of the candidate object region, contrast of the candidate object region (or contrast of an object within the candidate object region), brightness of the candidate object region (or brightness of an object within the candidate object region), and chromaticity of the candidate object region (or chromaticity of an object within the candidate object region), wherein the fourth step further includes a step of controlling object region recognition data having a calculated high cognitive difficulty level, among a plurality of object region recognition data to be provided to a user terminal, to be included in a range of order in which the object region recognition data is first provided to the user terminal.

In the method of improving reliability of artificial intelligence-based object recognition using collective intelligence-based mutual verification according to the present disclosure, the fourth step may further include a step of controlling a reference object image, including the structured image of the recognition target object, to be displayed in a given region of a screen identical with a screen on which the object region recognition data is displayed, by providing the user terminal with the reference object image.

In the method of improving reliability of artificial intelligence-based object recognition using collective intelligence-based mutual verification according to the present disclosure, the designated ratio may include at least one of ratios of 51% to 100%.

In the method of improving reliability of artificial intelligence-based object recognition using collective intelligence-based mutual verification according to the present disclosure, the fifth step may further include a step of increasing an incentive score for providing a designated incentive to a user who has selected an effective object region identical with effective object regions selected by a designated ratio or more of users for each object region selection data.

In the method of improving reliability of artificial intelligence-based object recognition using collective intelligence-based mutual verification according to the present disclosure, the fifth step may further include a step of increasing a penalty score for providing a designated penalty to a user who has selected an effective object region different from effective object regions selected by a designated ratio or more of users for each object region selection data.

Advantageous Effects

According to the present disclosure, there are advantages in that reliability of artificial intelligence-based object recognition can be improved using collective intelligence-based mutual verification and that the investment of professional personnel for increasing accuracy of object recognition can be minimized and costs and time can be reduced by the participation of reliable majorities.

BRIEF DESCRIPTION OF DRAWINGS

FIG. 1 is a diagram illustrating a configuration of a system for improving reliability of artificial intelligence-based object recognition according to an implementation method of the present disclosure.

FIG. 2 is a diagram illustrating a process of recognizing an object region included in learning data and extracting object region recognition data according to an implementation method of the present disclosure.

FIG. 3a is a diagram illustrating a process of providing object region recognition data to a terminal used by a user who has gender information matched with gender relevance to a recognition target object according to an implementation method of the present disclosure.

FIG. 3b is a diagram illustrating a process of providing object region recognition data to a terminal used by a user who has age information matched with age relevance to a recognition target object according to an implementation method of the present disclosure.

FIG. 3c is a diagram illustrating a process of providing object region recognition data to a terminal used by a user who has religion information matched with religion relevance to a recognition target object according to an implementation method of the present disclosure.

FIG. 3d is a diagram illustrating a process of providing object region recognition data to a terminal used by a user who has national origin information matched with national origin relevance to a recognition target object according to an implementation method of the present disclosure.

FIG. 3e is a diagram illustrating a process of providing object region recognition data to a terminal used by a user who has professional field information matched with professional field relevance to a recognition target object according to an implementation method of the present disclosure.

FIG. 4 is a diagram illustrating a process of providing object region recognition data to a terminal of a user based on a cognitive difficulty level for recognizing a recognition target object according to an implementation method of the present disclosure.

FIG. 5 is a diagram illustrating a process of analyzing object region selection data of respective users received from user terminals and determining learning data for improving reliability of an artificial intelligence module according to an implementation method of the present disclosure.

BEST MODE

A method of improving reliability of artificial intelligence-based object recognition using collective intelligence-based mutual verification according to the present disclosure is executed by a server operating in conjunction with an artificial intelligence module, and includes: a first step of training the artificial intelligence module by inputting, to the artificial intelligence module, M (M≥2) structured data corresponding to a structured image of a recognition target object to be recognized through the artificial intelligence module; a second step of preparing N (N≥2) learning data including one or more of the structured image and unstructured image of the recognition target object; a third step of recognizing one or more object regions included in the N learning data and extracting N object region recognition data in which the recognized object regions have been set on the N learning data; a fourth step of performing, on designated u (1≤u≤U) users for a given time, a procedure of providing, in a designated order, ni (1≤ni≤N) object region recognition data to an i-th user terminal used by an i-th user (1≤i≤U) user among U (U≥2) users and receiving, from the i-th user terminal, ni object region selection data including at least one effective object region corresponding to the recognition target object and selected among one or more object regions included in the ni object region recognition data, and a procedure of providing, in a designated order, nj (1≤nj≤N) object region recognition data to a j-th user terminal used by a j-th (1≤j≤U, i≠j) user and receiving, from the j-th user terminal, nj object region selection data including at least one effective object region corresponding to the recognition target object and selected among one or more object regions included in the nj object region recognition data; a fifth step of determining n learning data, which are to be input to and learnt by the artificial intelligence module in order to improve reliability of the artificial intelligence module, by performing a collective intelligence-based mutual verification procedure of selecting n (1≤n≤N) object region selection data including an identical effective object region selected by a designated ratio or more of users among v (1≤v≤u) users who have selected effective object regions for each object region selection data by mutually comparing and analyzing object region selection data of the respective u users, received from the u user terminals, for each identical object region selection data; and a sixth step of training the artificial intelligence module by inputting the determined n learning data to the artificial intelligence module.

MODE FOR INVENTION

Hereinafter, an operation principle of a preferred embodiment of the present disclosure is described in detail with reference to the accompanying drawings and description. However, the accompanying drawings and the description to be described later are related to preferred implementation methods among several methods for effectively describing characteristics of the present disclosure, and the present disclosure is not limited by only the accompanying drawings and the description.

That is, the following embodiments correspond to embodiments having a preferred union form among many embodiments of the present disclosure. It is evident that all of an embodiment in which a specific element (or step) is omitted, an embodiment in which a function implemented in a specific element (or step) is divided into specific elements (or steps), an embodiment in which a function implemented in two or more elements (or steps) are integrated into any one element (or step), an embodiment in which operation order of a specific element (or step) is replaced, etc. in the following embodiments belong to the scope of right of the present disclosure unless described otherwise in the following embodiments. Accordingly, it is evident that various embodiments corresponding to a subset or a complementary set based on the following embodiments may be divided based on the retroactive application of the filing date of the present disclosure.

Furthermore, in the following description of the present disclosure, a detailed description of a related known function or configuration will be omitted if it is deemed to make the subject matter of the present disclosure unnecessarily vague. Furthermore, terms to be described hereinafter may be defined by taking into consideration functions in the present disclosure, and may be different depending on a user, an operator's intention or practice. Accordingly, each term should be defined based on contents over the entire specification.

As a result, the technical spirit of the present disclosure is determined by the claims. The following embodiment is merely one means for efficiently describing the advanced technical spirit of the present disclosure to a person having ordinary knowledge in the art to which the present disclosure pertains.

FIG. 1 is a diagram illustrating a configuration of a system for improving reliability of artificial intelligence-based object recognition according to an implementation method of the present disclosure.

More specifically, FIG. 1 illustrates the configuration of a system for recognizing, by a server 100 operating in conjunction with an artificial intelligence module 170, one or more object regions included in learning data including a structured image or unstructured image of a recognition target object to be recognized through the artificial intelligence module 170, extracting object region recognition data in which the recognized object regions have been set, determining learning data, which are to be input to and learnt by the artificial intelligence module 170 in order to improve reliability of the artificial intelligence module 170, by performing, for a given time, a procedure of providing the extracted object region recognition data to one or more user terminals 165 in a designated order and receiving, from the user terminals, object region selection data including at least one effective object region corresponding to the recognition target object and selected among the one or more object regions included in the object region recognition data and by performing a collective intelligence-based mutual verification procedure of selecting object region selection data including the same effective object region selected by a designated ratio or more of users among users who have selected the effective object regions for each object region selection data by mutually comparing and analyzing object region selection data of the respective users, received from the user terminals 165, for each identical object region selection data, and training the artificial intelligence module 170 by inputting the determined learning data to the artificial intelligence module 170. A person having ordinary knowledge in the art to which the present disclosure pertains may derive various implementation methods (e.g., an implementation method of omitting, subdividing or merging some elements) of the configuration of the system with reference to and/or by modifying FIG. 1, but the present disclosure includes all the derived implementation methods, and the technical characteristics thereof are not limited by only the implementation method illustrated in FIG. 1.

The system of the present disclosure may include the artificial intelligence module 170 configured to learn two or more structured data input by the server 100 and corresponding to a structured image of a recognition target object, the user terminals 165 configured to provide the server 100 with object region selection data including at least one effective object region corresponding to the recognition target object and selected among one or more object regions included in the object region recognition data provided by the server 100 in a designated order, and the server 100 configured to operate in conjunction with the artificial intelligence module 170 and having a function of training the artificial intelligence module 170 by inputting, to the artificial intelligence module 170, two or more structured data corresponding to the structured image of the recognition target object to be recognized through the artificial intelligence module 170, a function of preparing two or more learning data including one or more of the structured image and an unstructured image of the recognition target object, a function of extracting two or more object region recognition data in which the recognized object regions have been set on the learning data by recognizing the one or more object regions included in the learning data, a function of performing, for a given time, a procedure of extracting object region recognition data in which the recognized object regions have been set, providing the extracted object region recognition data to the one or more user terminals 165 in a designated order, and receiving, from the user terminals, object region selection data including at least one effective object region corresponding to the recognition target object and selected among the one or more object regions included in the object region recognition data, a function of performing a collective intelligence-based mutual verification procedure of selecting object region selection data including the same effective object region selected by a designated ratio or more of users among users who have selected the effective object regions for each object region selection data by mutually comparing and analyzing object region selection data of the respective users, received from the user terminals 165, for each identical object region selection data, a function of determining learning data to be input to and learnt by the artificial intelligence module 170 in order to improve reliability of the artificial intelligence module 170, and a function of training the artificial intelligence module 170 by inputting the determined learning data to the artificial intelligence module 170.

Meanwhile, the server 100 may be implemented as one or more servers for including the one or more functions. The present disclosure is not limited by an embodiment in which the server 100 is implemented or a physical server configuration or name of the server 100. Hereinafter, characteristics of the present disclosure are described with reference to FIG. 1 illustrates, for convenience sake, the server 100 in a single server form that communicates with the user terminal 165 and operates in conjunction with the artificial intelligence module 170.

The user terminal 165 is a general name of a wired terminal and wireless terminal, and the wired terminal and wireless terminal are used by a user, receive object region recognition data from the server 100 in a designated order, and transmit, to the server 100, object region selection data including at least one effective object region corresponding to a recognition target object and selected among one or more object regions included in the object region recognition data. The user terminal 165 may install a designated app or program therein and execute the app or program installed therein, for communication with the server 100.

The artificial intelligence module 170 may be implemented as one or more servers for learning two or more structured data which correspond to a structured image of a recognition target object and are input by the server 100. The present disclosure is not limited by an embodiment in which the artificial intelligence module 170 is implemented or a physical configuration or name of the artificial intelligence module 170. Hereinafter, characteristics of the present disclosure are described with reference to FIG. that illustrates, for convenience sake, the artificial intelligence module 170 in one module form which operates in conjunction with the server 100.

Furthermore, the artificial intelligence module 170 may receive and learn one or more learning data determined in order to improve reliability of the artificial intelligence module 170 by performing a collective intelligence-based mutual verification procedure through the server 100.

According to the present disclosure, the artificial intelligence module 170 may include an object region recognition unit 175. The server 100 may extract object region recognition data in which one or more object regions recognized by the object region recognition unit 175 of the artificial intelligence module 170 have been set on the learning data by substituting the learning data into the object region recognition unit 175 of the artificial intelligence module 170 that has learnt structured data.

Referring to FIG. 1, the server 100 may include a structured data input unit 105 configured to input two or more structured data to the artificial intelligence module 170, a learning data preparation unit 110 configured to prepare learning data including one or more images, a recognition data extraction unit 115 configured to extract object region recognition data in which an object region has been set, a data processing unit 120 configured to perform a procedure of providing the one or more user terminals 165 with object region recognition data and receiving object region selection data including effective object regions selected by the user terminals 165, a learning data determination unit 125 configured to determine n learning data to be input to and learnt by the artificial intelligence module 170 in order to improve reliability of the artificial intelligence module 170, and a learning data input unit 130 configured to input the determined learning data to the artificial intelligence module 170.

Furthermore, the server 100 may further include an information storage unit 135 configured to receive gender information, age information, religion information, national origin information, and professional field information registered by U users and to store received information in a designated management DB 160, a relevance determination unit 140 configured to determine relevance between a recognition target object and the gender, age, religion, country of origin, or professional field when the recognition target object to be recognized through the artificial intelligence module is determined, a location-related information acquisition unit 145 configured to obtain at least one piece of location-related information among pieces of information on a country, an area, and a location where the user terminal 165 accessed over a communication network is placed, and a terminal check unit 150 configured to check two or more user terminals belonging to a designated boundary range or distance range by reading location-related information of user terminals accessed in the same time zone or to check two or more user terminals, belonging to a designated boundary range or distance range, by reading location-related information of user terminals which are to be provided with object region recognition data of the same recognition target object in the same time zone.

The structured data input unit 105 may train the artificial intelligence module 170 by inputting, to the artificial intelligence module 170, M (M≥2) structured data corresponding to a structured image of a recognition target object to be recognized through the artificial intelligence module 170.

When the M (M≥2) structured data are input to the artificial intelligence module 170 and the artificial intelligence module 170 is trained through the structured data input unit 105, the learning data preparation unit 110 may prepare N (N≥2) learning data including one or more of a structured image and unstructured image of the recognition target object.

In this case, the structured image may include only an image of the recognition target object or may include only a designated background and an image of the recognition target object.

Furthermore, if the recognition target object is a person, the structured image may include at least one of a photo image of the recognition target person in a front direction and a photo image of the recognition target person, which is captured within a designated permissible angle range based on the front direction.

Furthermore, if the recognition target object is a thing, the structured image may include at least one of a photo image of the recognition target thing for each direction, a drawing image of the recognition target thing for each direction, a 2D modeling image of the recognition target thing for each direction, and a 3D modeling image of the recognition target thing for each direction.

In this case, the unstructured image may further include images of one or more non-recognition target objects in addition to an image of the recognition target object.

Furthermore, the unstructured image may include at least one of a modification image modified from an image of the recognition target object within a designated permissible range and a partial image obtained by exposing a unique characteristic portion of the recognition target object at a given ratio or more.

When the N learning data is prepared through the learning data preparation unit 110, the recognition data extraction unit 115 may recognize one or more object regions included in the N learning data and extract N object region recognition data in which the recognized one or more object regions have been set on the N learning data.

According to an implementation method of the present disclosure, the recognition data extraction unit 115 may extract N object region recognition data in which one or more object regions recognized through a designated object region recognition algorithm have been set on the N learning data by substituting the N learning data into the object region recognition algorithm.

Furthermore, according to an implementation method of the present disclosure, the recognition data extraction unit 115 may extract N object region recognition data in which one or more object regions recognized through the object region recognition unit 175 of the artificial intelligence module 170 have been set on the N learning data by substituting the N learning data into the object region recognition unit 175 of the artificial intelligence module 170 that has learnt the M structured data.

Furthermore, according to an implementation method of the present disclosure, the recognition data extraction unit 115 may extract N object region recognition data in which one or more object regions recognized through an object region recognition algorithm equivalent to the object region recognition unit 175 of the artificial intelligence module 170 have been set on the N learning data by substituting the N learning data into the object region recognition algorithm.

According to an implementation method of the present disclosure, the recognition data extraction unit 115 may select at least one candidate object region predicted to correspond to the recognition target object, among the one or more object regions included in the N object region recognition data, by analyzing the N object region recognition data through the artificial intelligence module 170, and may calculate cognitive difficulty levels of the respective N object region recognition data for recognizing the recognition target object through a human vision, based on at least one or a combination of two or more among the size of the selected candidate object region (or the size of an object within the candidate object region), resolution of the candidate object region, contrast of the candidate object region (or contrast of an object within the candidate object region), brightness of the candidate object region (or brightness of an object within the candidate object region), and chromaticity of the candidate object region (or chromaticity of an object within the candidate object region).

When the N object region recognition data are extracted through the recognition data extraction unit 115, the data processing unit 120 may perform, on designated u (1≤u≤U) users for a given time, a procedure of providing, in a designated order, ni (1≤ni≤N) object region recognition data to an i-th user terminal used by an i-th (1≤i≤U)—user among U (U≥2) users and receiving, from the i-th user terminal, ni object region selection data including at least one effective object region corresponding to the recognition target object and selected among one or more object regions included in the ni object region recognition data, and a procedure of providing, in a designated order, nj (1≤nj≤N) object region recognition data to a j-th user terminal used by a j-th (1≤j≤U, i≠j) user and receiving, from the j-th user terminal, nj object region selection data including at least one effective object region corresponding to the recognition target object and selected among one or more object regions included in the nj object region recognition data.

According to the present disclosure, the ni object region recognition data provided to the i-th user terminal in a designated order may include object region recognition data provided in order different from that of object region recognition data included in the nj object region recognition data.

Furthermore, according to the present disclosure, the ni object region recognition data provided to the i-th user terminal in a designated order may not include one or more of the object region recognition data included in the nj object region recognition data.

Furthermore, according to the present disclosure, the ni object region recognition data provided to the i-th user terminal in a designated order may include one or more of object region recognition data not included in the nj object region recognition data.

According to an implementation method of the present disclosure, after gender information of U users is registered and stored in the designated management DB 160 through the information storage unit 135, when gender relevance to a recognition target object to be recognized through the artificial intelligence module 170 is determined through the relevance determination unit 140 if a recognition target object is determined, the data processing unit 120 may control a designated number of object region recognition data to be provided, in a designated order, to the user terminal 165 used by a user who has gender information matched with the gender relevance to the recognition target object, among the U users. For example, if the recognition target object is a female product, it is preferred that the object region recognition data are provided to females. If the recognition target object has no special gender relevance, the object region recognition data may be provided without being limited to specific gender.

Furthermore, according to an implementation method of the present disclosure, after age information of U users are registered and stored in the designated management DB 160 through the information storage unit 135, when age relevance to a recognition target object to be recognized through the artificial intelligence module 170 is determined through the relevance determination unit 140 if the recognition target object is determined, the data processing unit 120 may control a designated number of object region recognition data to be provided, in a designated order, to the user terminal 165 used by a user who has age information matched with the age relevance to the recognition target object, among the U users.

Furthermore, according to an implementation method of the present disclosure, after religion information of U users are registered and stored in the designated management DB 160 through the information storage unit 135, when religion relevance to a recognition target object to be recognized through the artificial intelligence module 170 is determined through the relevance determination unit 140 if the recognition target object is determined, the data processing unit 120 may control a designated number of object region recognition data to be provided, in a designated order, to the user terminal 165 used by a user who has religion information matched with the religion relevance to the recognition target object, among the U users.

Furthermore, according to an implementation method of the present disclosure, after national origin information of U users are registered and stored in the designated management DB 160 through the information storage unit 135, when national origin relevance to a recognition target object to be recognized through the artificial intelligence module 170 is determined through the relevance determination unit 140 if the recognition target object is determined, the data processing unit 120 may control a designated number of object region recognition data to be provided, in a designated order, to the user terminal 165 used by a user who has country of origin information matched with the national origin relevance to the recognition target object, among the U users.

Furthermore, according to an implementation method of the present disclosure, after professional field information of U users are registered and stored in the designated management DB 160 through the information storage unit 135, when professional field relevance to a recognition target object to be recognized through the artificial intelligence module 170 is determined through the relevance determination unit 140 if the recognition target object is determined, the data processing unit 120 may control a designated number of object region recognition data to be provided, in a designated order, to the user terminal 165 used by a user who has professional field information matched with the professional field relevance to the recognition target object, among the U users.

According to an implementation method of the present disclosure, when at least one piece of location-related information among pieces of information on a country, an area, and a location where the user terminal 165 accessed over a communication network is placed is obtained through the location-related information acquisition unit 145 and two or more user terminals 165 belonging to a designated boundary range or distance range are checked by reading location-related information of the user terminals 165 accessed in the same time zone through the terminal check unit 150, the data processing unit 120 may control object region recognition data of different recognition target objects to be provided, in a designated order, to the checked two or more user terminals 165. For example, the boundary range includes the range of a boundary in a map or an administrative district of a country or area. The country, area, and location may be checked by reading an IP address of the user terminal 165 or may be checked based on location information based on a base station wirelessly connected to a wireless terminal and location information based on GPSs mounted in the wireless terminal if the user terminal 165 is the wireless terminal.

Furthermore, according to an implementation method of the present disclosure, when at least one piece of location-related information among pieces of information on a country, an area, and a location where the user terminal 165 accessed over a communication network is placed is obtained through the location-related information acquisition unit 145 and two or more user terminals 165 belonging to a designated boundary range or distance range are checked by reading location-related information of the user terminals 165, which are to be provided with object region recognition data of the same recognition target object in the same time zone, through the terminal check unit 150, the data processing unit 120 may control the object region recognition data of the recognition target object to be provided to the checked two or more user terminals 165 in different orders in which the object region recognition data do not overlap.

According to an implementation method of the present disclosure, when cognitive difficulty levels of N object region recognition data for recognizing the recognition target object through a human vision are calculated through the recognition data extraction unit 115, the data processing unit 120 may control object region recognition data having a calculated high cognitive difficulty level, among a plurality of object region recognition data to be provided to the user terminal 165, to be included in a range of order in which the object region recognition data is first provided to the user terminal 165. For example, if the size/resolution of an object in an image is small, it is not easy to intuitively immediately recognize the object through a vision. If the boundary of an object is a blur (=contrast) or the object is dark (=brightness) or color of the object is difficult to identify (=chromaticity), it is difficult to intuitively immediately recognize the image through a vision. In this case, object region recognition data may be first provided at timing at which a degree of fatigue is low, so that the image can be recognized.

According to an implementation method of the present disclosure, the data processing unit 120 may control a reference object image, including a structured image of the recognition target object, to be displayed in a given region of the same screen as that on which the object region recognition data is displayed, by providing the user terminal 165 with the reference object image. For example, the reference object image may help a user to select a recognition target object and may induce a user to select a recognition target object while watching a reference object although the user's concentration is lowered.

After the procedure of receiving the nj object region selection data including the selected at least one effective object region is performed on designated u users for a given time through the data processing unit 120, the learning data determination unit 125 may determine n learning data, which are to be input to and learnt by the artificial intelligence module 170 in order to improve reliability of the artificial intelligence module 170, by performing a collective intelligence-based mutual verification procedure of selecting n (1≤n≤N) object region selection data including the same effective object region selected by a designated ratio (e.g., including at least one of ratios of 51% to 100%) of users among v (1≤v≤u) users who have selected respective effective object regions for each object region selection data by mutually comparing and analyzing object region selection data of the u users, received from the u user terminals 165, for each identical object region selection data.

According to the present disclosure, the n learning data may include at least one effective object region verified as an effective object region of the recognition target object through the collective intelligence-based mutual verification procedure.

According to an implementation method of the present disclosure, the learning data determination unit 125 may increase an incentive score for providing a designated incentive to a user who has selected the same effective object region as effective object regions selected by a designated ratio or more of users for each object region selection data.

Furthermore, according to an implementation method of the present disclosure, the learning data determination unit 125 may reject an increase in the incentive score for providing a designated incentive to a user who has selected an effective object region different from effective object regions selected by a designated ratio or more of users for each object region selection data.

In this case, the learning data determination unit 125 may provide a designated incentive to a user who has the incentive score equal to or greater than a preset reference value. For example, the incentive may include economic gains, such as points, money, and coupons, and may be differently provided based on an incentive score.

Furthermore, according to an implementation method of the present disclosure, the learning data determination unit 125 may increase a penalty score for providing a designated penalty to a user who has selected an effective object region different from effective object region selected by a designated ratio or more of users for each object region selection data, and may provide a designated penalty to a user who has the penalty score equal to or greater than a preset reference value.

In this case, the penalty may include restriction to or rejection against participation into business for which a user is provided with a designated incentive by selecting an effective object region included in the object region recognition data.

When the n learning data to be input to and learnt by the artificial intelligence module 170 are determined through the learning data determination unit 125, the learning data input unit 130 may train the artificial intelligence module by inputting the determined n learning data to the artificial intelligence module.

FIG. 2 is a diagram illustrating a process of recognizing an object region included in learning data and extracting object region recognition data according to an implementation method of the present disclosure.

More specifically, FIG. 2 is a diagram illustrating one embodiment of a process of preparing, by the server 100 operating in conjunction with the artificial intelligence module 170 illustrated in FIG. 1, N (N≥2) learning data including one or more of a structured image and unstructured image of a recognition target object, recognizing one or more object regions included in the N learning data, and extracting N object region recognition data in which the recognized object regions have been set on the N learning data. A person having ordinary knowledge in the art to which the present disclosure pertains may derive various implementation methods (e.g., an implementation method in which some steps have been omitted or order of steps has been changed) of the process with reference to and/or by modifying FIG. 2, but the present disclosure includes all the derived implementation methods, and the technical characteristics thereof are not limited by only the implementation method illustrated in FIG. 2.

Referring to FIG. 2, the illustrated embodiment may start from a process of training, by the server 100, the artificial intelligence module 170 by inputting, to the artificial intelligence module 170, M (M≥2) structured data corresponding to a structured image of a recognition target object be recognized through the artificial intelligence module 170 (200).

Thereafter, the server 100 prepares N (N≥2) learning data including one or more of the structured image and unstructured image of the recognition target object (205). In this case, the structured image may include only an image of the recognition target object or may include only a designated background and an image of the recognition target object.

Furthermore, if the recognition target object is a person, the structured image may include at least one of a photo image of the recognition target person in a front direction and a photo image of the recognition target person, which is captured within a designated permissible angle range based on the front direction. If the recognition target object is a thing, the structured image may include at least one of a photo image of the recognition target thing for each direction, a drawing image of the recognition target thing for each direction, a 2D modeling image of the recognition target thing for each direction, and a 3D modeling image of the recognition target thing for each direction.

In this case, the unstructured image may further include images of one or more non-recognition target objects in addition to an image of the recognition target object. Furthermore, the unstructured image may include at least one of a modification image modified from an image of the recognition target object within a designated permissible range and a partial image obtained by exposing a unique characteristic portion of the recognition target object at a given ratio or more.

When the N learning data is prepared, the server 100 recognizes one or more object regions included in the N learning data (210), and extracts N object region recognition data in which the recognized object regions have been set on the N learning data (215).

In this case, the server 100 may extract N object region recognition data in which one or more object regions recognized through a designated object region recognition algorithm have been set on the N learning data by substituting the N learning data into the object region recognition algorithm, may extract N object region recognition data in which one or more object regions recognized through the object region recognition unit 175 of the artificial intelligence module 170 have been set on the N learning data by substituting the N learning data into the object region recognition unit 175 of the artificial intelligence module 170 that has learnt the M structured data or may extract N object region recognition data in which one or more object regions recognized through an object region recognition algorithm equivalent to the object region recognition unit 175 of the artificial intelligence module 170 have been set on the N learning data by substituting the N learning data into the object region recognition algorithm.

FIG. 3a is a diagram illustrating a process of providing object region recognition data to a terminal used by a user who has gender information matched with gender relevance to a recognition target object according to an implementation method of the present disclosure.

More specifically, FIG. 3a is a diagram illustrating one embodiment of a process of providing object region recognition data to the user terminal 165 used by a user who has gender information matched with the gender relevance to a recognition target object to be recognized through the artificial intelligence module 170, if the recognition target object is determined after N object region recognition data in which recognized object regions have been set are extracted through the process of FIG. 2. A person having ordinary knowledge in the art to which the present disclosure pertains may derive various implementation methods (e.g., an implementation method in which some steps have been omitted or order of steps has been changed) of the process with reference to and/or by modifying FIG. 3a, but the present disclosure includes all the derived implementation methods, and the technical characteristics thereof are not limited by only the implementation method illustrated in FIG. 3a.

Referring to FIG. 3a, the illustrated embodiment may start from a process of receiving registered gender information of U users and storing the received gender information in the designated management DB 160 after, through the process of FIG. 2, the server 100 recognizes one or more object regions included in the N learning data and extracts N object region recognition data in which the recognized object regions have been set on the N learning data (300a).

Thereafter, when a recognition target object to be recognized through the artificial intelligence module 170 is determined (305a), the server 100 determines gender relevance to the recognition target object (310a).

Furthermore, the server 100 checks a user who has gender information matched with the gender relevance to the recognition target object among the U users (315a), and controls a designated number of object region recognition data to be provided, in a designated order, to the user terminal 165 used by the checked user (320a).

FIG. 3b is a diagram illustrating a process of providing object region recognition data to a terminal used by a user who has age information matched with age relevance to a recognition target object according to an implementation method of the present disclosure.

More specifically, FIG. 3b is a diagram illustrating one embodiment of a process of providing object region recognition data to the user terminal 165 used by a user who has age information matched with the age relevance to a recognition target object, if the recognition target object to be recognized through the artificial intelligence module 170 is determined after N object region recognition data in which recognized object regions have been set are extracted through the process of FIG. 2. A person having ordinary knowledge in the art to which the present disclosure pertains may derive various implementation methods (e.g., an implementation method in which some steps have been omitted or order of steps has been changed) of the process with reference to and/or by modifying FIG. 3b, but the present disclosure includes all the derived implementation methods, and the technical characteristic thereof are not limited by only the implementation method illustrated in FIG. 3b.

Referring to FIG. 3b, the illustrated embodiment may start from a process of receiving registered age information of U users and storing the received age information in the designated management DB 160 after, through the process of FIG. 2, the server 100 recognizes one or more object regions included in the N learning data and extracts N object region recognition data in which the recognized object regions have been set on the N learning data (300b).

Thereafter, when a recognition target object to be recognized through the artificial intelligence module 170 is determined (305b), the server 100 determines age relevance to the recognition target object (310b).

Furthermore, the server 100 checks a user who has age information matched with the age relevance to the recognition target object among the U users (315b), and controls a designated number of object region recognition data to be provided, in a designated order, to the user terminal 165 used by the checked user (320b).

FIG. 3c is a diagram illustrating a process of providing object region recognition data to a terminal used by a user who has religion information matched with religion relevance to a recognition target object according to an implementation method of the present disclosure.

More specifically, FIG. 3c is a diagram illustrating one embodiment of a process of providing object region recognition data to the user terminal 165 used by a user who has religion information matched with the religion relevance to a recognition target object to be recognized through the artificial intelligence module 170 if the recognition target object is determined after N object region recognition data in which recognized object regions have been set are extracted through the process of FIG. 2. A person having ordinary knowledge in the art to which the present disclosure pertains may derive various implementation methods (e.g., an implementation method in which some steps have been omitted or order of steps has been changed) of the process with reference to and/or by modifying FIG. 3c, but the present disclosure includes all the derived implementation methods, and the technical characteristics thereof are not limited by only the implementation method illustrated in FIG. 3c.

Referring to FIG. 3c, the illustrated embodiment may start from a process of receiving registered religion information of U users and storing the received religion information in the designated management DB 160 after, through the process of FIG. 2, the server 100 recognizes one or more object regions included in the N learning data and extracts N object region recognition data in which the recognized object regions have been set on the N learning data (300c).

Thereafter, when a recognition target object to be recognized through the artificial intelligence module 170 is determined (305c), the server 100 determines religion relevance to the recognition target object (310c).

Furthermore, the server 100 checks a user who has religion information matched with the religion relevance to the recognition target object among the U users (315c), and controls a designated number of object region recognition data to be provided, in a designated order, to the user terminal 165 used by the checked user (320c).

FIG. 3d is a diagram illustrating a process of providing object region recognition data to a terminal used by a user who has national origin information matched with national origin relevance to a recognition target object according to an implementation method of the present disclosure.

More specifically, FIG. 3d is a diagram illustrating one embodiment of a process of providing object region recognition data to the user terminal 165 used by a user who has national origin information matched with the national origin relevance to a recognition target object to be recognized through the artificial intelligence module 170, if the recognition target object is determined after N object region recognition data in which recognized object regions have been set are extracted through the process of FIG. 2. A person having ordinary knowledge in the art to which the present disclosure pertains may derive various implementation methods (e.g., an implementation method in which some steps have been omitted or order of steps has been changed) of the process with reference to and/or by modifying FIG. 3*d*, but the present disclosure includes all the derived implementation methods, and the technical characteristics thereof are not limited by only the implementation method illustrated in FIG. 3*d*.

Referring to FIG. 3*d*, the illustrated embodiment may start from a process of receiving registered national origin information of U users and storing the received national origin information in the designated management DB 160 after, through the process of FIG. 2, the server 100 recognizes one or more object regions included in the N learning data and extracts N object region recognition data in which the recognized object regions have been set on the N learning data (300*d*).

Thereafter, when a recognition target object to be recognized through the artificial intelligence module 170 is determined (305*d*), the server 100 determines national origin relevance to the recognition target object (310*d*).

Furthermore, the server 100 checks a user who has country of origin information matched with the national origin relevance to the recognition target object among the U users (315*d*), and controls a designated number of object region recognition data to be provided, in a designated order, to the user terminal 165 used by the checked user (320*d*).

FIG. 3*e* is a diagram illustrating a process of providing object region recognition data to a terminal used by a user who has professional field information matched with professional field relevance to a recognition target object according to an implementation method of the present disclosure.

More specifically, FIG. 3*e* is a diagram illustrating one embodiment of a process of providing object region recognition data to the user terminal 165 used by a user who has professional field information matched with the professional field relevance to a recognition target object to be recognized through the artificial intelligence module 170, if the recognition target object is determined after N object region recognition data in which recognized object regions have been set are extracted through the process of FIG. 2. A person having ordinary knowledge in the art to which the present disclosure pertains may derive various implementation methods (e.g., an implementation method in which some steps have been omitted or order of steps has been changed) of the process with reference to and/or by modifying FIG. 3*e*, but the present disclosure includes all the derived implementation methods, and the technical characteristics thereof are not limited by only the implementation method illustrated in FIG. 3*e*.

Referring to FIG. 3*e*, the illustrated embodiment may start from a process of receiving registered professional field information of U users and storing the received professional field information in the designated management DB 160 after, through the process of FIG. 2, the server 100 recognizes one or more object regions included in the N learning data and extracts N object region recognition data in which the recognized object regions have been set on the N learning data (300*e*).

Thereafter, when a recognition target object to be recognized through the artificial intelligence module 170 is determined (305*e*), the server 100 determines professional field relevance to the recognition target object (310*e*).

Furthermore, the server 100 checks a user who has professional field information matched with the professional field relevance to the recognition target object among the U users (315*e*), and controls a designated number of object region recognition data, in a designated order, to be provided to the user terminal 165 used by the checked user (320*e*).

FIG. 4 is a diagram illustrating a process of providing object region recognition data to a terminal of a user based on a cognitive difficulty level for recognizing a recognition target object according to an implementation method of the present disclosure.

More specifically, FIG. 4 is a diagram illustrating one embodiment of a process of calculating a cognitive difficulty level for each object region recognition data based on an attribute (e.g., a size, resolution, contrast, brightness, or chromaticity) of a candidate object region predicted to correspond to a recognition target object after N object region recognition data in which recognized object regions have been set are extracted through the process of FIG. 2, and preferentially providing a user terminal with object region recognition data having the calculated high cognitive difficulty level. A person having ordinary knowledge in the art to which the present disclosure pertains may derive various implementation methods (e.g., an implementation method in which some steps have been omitted or order of steps has been changed) of the process with reference to and/or by modifying FIG. 4, but the present disclosure includes all the derived implementation methods, and the technical characteristics thereof are not limited by only the implementation method illustrated in FIG. 4.

Referring to FIG. 4, the illustrated embodiment may start from a process of analyzing, by the server 100, N object region recognition data through the artificial intelligence module 170 after, through the process of FIG. 2, the server 100 recognizes one or more object regions included in the N learning data and extracts the N object region recognition data in which the recognized object regions have been set on the N learning data (400).

The server 100 selects at least one candidate object region predicted to correspond to a recognition target object among the one or more object regions included in the N object region recognition data through the analysis (405).

Furthermore, the server 100 calculates cognitive difficulty levels of the respective N object region recognition data for recognizing the recognition target object through a human vision, based on at least one or a combination of two or more among the size of the selected candidate object region (or the size of an object within the candidate object region), resolution of the candidate object region, contrast of the candidate object region (or contrast of an object within the candidate object region), brightness of the candidate object region (or brightness of an object within the candidate object region), and chromaticity of the candidate object region (or chromaticity of an object within the candidate object region) (410).

When the cognitive difficulty levels of the N object region recognition data are calculated, the server 100 controls object region recognition data having a calculated high cognitive difficulty level, among a plurality of object region recognition data to be provided to the user terminals 165, to be included in a range of order in which the object region recognition data is first provided to the user terminal 165 (415).

FIG. 5 is a diagram illustrating a process of analyzing object region selection data of respective users received from user terminals and determining learning data for improving reliability of the artificial intelligence module according to an implementation method of the present disclosure.

More specifically, FIG. 5 is a diagram illustrating one embodiment of a process of determining learning data, which are to be input to and learnt by the artificial intelligence module 170 in order to improve reliability of the artificial intelligence module 170, by using object region selection data of respective users received from the user terminals 165, after the object region recognition data are provided to the user terminals 165 through the processes of FIGS. 3a, 3b, 3c, 3d, 3e, and 4. A person having ordinary knowledge in the art to which the present disclosure pertains may derive various implementation methods (e.g., an implementation method in which some steps have been omitted or order of steps has been changed) of the process with reference to and/or by modifying FIG. 5, but the present disclosure includes all the derived implementation methods, and the technical characteristics thereof are not limited by only the implementation method illustrated in FIG. 5.

Referring to FIG. 5, the illustrated embodiment may start from a process of receiving, by the server 100, object region selection data of respective u users from u user terminals 165, after the object region recognition data are provided to the user terminals 165 through the processes of FIGS. 3a, 3b, 3c, 3d, 3e, and 4 (500).

Thereafter, the server 100 mutually compares and analyzes the received object region selection data of the respective u users for each identical object region selection data (505), and performs a collective intelligence-based mutual verification procedure of selecting n ($1 \geq n \geq N$) object region selection data including the same effective object region selected by a designated ratio or more of users among v ($1 \geq v \geq u$) users who have selected effective object regions for each object region selection data (510).

Furthermore, the server 100 determines n learning data to be input to and learnt by the artificial intelligence module 170 in order to improve reliability of the artificial intelligence module 170 (515), and trains the artificial intelligence module by inputting the determined n learning data to the artificial intelligence module (520).

The invention claimed is:

1. A method of improving reliability of artificial intelligence-based object recognition using collective intelligence-based mutual verification, the method executed by a server operating in conjunction with an artificial intelligence module and comprising:

a first step of training the artificial intelligence module by inputting, to the artificial intelligence module, M ($M \geq 2$) structured data corresponding to a structured image of a recognition target object to be recognized through the artificial intelligence module;

a second step of preparing N ($N \geq 2$) learning data comprising one or more of the structured image and unstructured image of the recognition target object;

a third step of recognizing one or more object regions included in the N learning data and extracting N object region recognition data in which the recognized object regions have been set on the N learning data;

a fourth step of performing, on designated u ($1 \leq u \leq U$) users for a given time, a procedure of providing, in a designated order, ni ($1 \leq ni \leq N$) object region recognition data to an i-th user terminal used by an i-th ($1 \leq i \leq U$) user among U ($U \geq 2$) users and receiving, from the i-th user terminal, ni object region selection data comprising at least one effective object region corresponding to the recognition target object and selected among one or more object regions included in the ni object region recognition data, and a procedure of providing, in a designated order, nj ($1 \leq nj \leq N$) object region recognition data to a j-th user terminal used by a j-th ($1 \leq j \leq U$, $i \neq j$) user and receiving, from the j-th user terminal, nj object region selection data comprising at least one effective object region corresponding to the recognition target object and selected among one or more object regions included in the nj object region recognition data;

a fifth step of determining n learning data, which is to be input to and learnt by the artificial intelligence module in order to improve reliability of the artificial intelligence module, by performing a collective intelligence-based mutual verification procedure of selecting n ($1 \leq n \leq N$) object region selection data comprising an identical effective object region selected by a designated ratio or more of users among v ($1 \leq v \leq u$) users who have selected effective object regions for each object region selection data by mutually comparing and analyzing object region selection data of respective u users, received from the u user terminals, for each identical object region selection data; and a sixth step of training the artificial intelligence module by inputting the determined n learning data to the artificial intelligence module, wherein the third step further comprises steps of:

selecting at least one candidate object region predicted to correspond to the recognition target object, among the one or more object regions included in the N object region recognition data, by analyzing the N object region recognition data through the artificial intelligence module; and calculating cognitive difficulty levels of the respective N object region recognition data for recognizing the recognition target object through a human vision, based on at least one selected from a group consisting of a size of the selected candidate object region, a size of an object within the candidate object region, resolution of the candidate object region, contrast of the candidate object region, contrast of an object within the candidate object region, brightness of the candidate object region, brightness of an object within the candidate object region, chromaticity of the candidate object region, and chromaticity of an object within the candidate object region, and wherein the fourth step further comprises a step of controlling object region recognition data having a calculated high cognitive difficulty level, among a plurality of object region recognition data to be provided to a user terminal, to be included in a range of order in which the object region recognition data is first provided to the user terminal.

2. The method of claim 1, wherein the third step comprises a step of:

extracting N object region recognition data in which one or more object regions recognized through a designated object region recognition algorithm have been set on the N learning data by substituting the N learning data into the object region recognition algorithm, or extracting N object region recognition data in which one or more object regions recognized through an object region recognition unit of the artificial intelligence module which has learnt the M structured data have been set on the N learning data by substituting the N learning data into the object region recognition unit, or extracting N object region recognition data in which one or more object regions recognized through an object region recognition algorithm equivalent to the object region recognition unit of the artificial intelligence module have been set on the N learning data by substituting the N learning data into the object region recognition algorithm.

3. The method of claim 1, wherein the ni object region recognition data comprises object region recognition data provided in order different from order of object region recognition data included in the nj object region recognition data, does not comprise one or more of the object region recognition data included in the nj object region recognition data, or comprises one or more of object region recognition data not included in the nj object region recognition data.

4. The method of claim 1, further comprising steps of:
receiving registered gender information of the U users and storing the received gender information in a designated management database ("DB"), and
determining gender relevance to a recognition target object to be recognized through the artificial intelligence module if the recognition target object is determined,
wherein the fourth step comprises a step of controlling a designated number of object region recognition data to be provided, in a designated order, to a user terminal used by a user who has gender information matched with the gender relevance to the recognition target object among the U users.

5. The method of claim 1, further comprising steps of:
receiving registered age information of the U users and storing the received age information in a designated management DB, and
determining age relevance to a recognition target object to be recognized through the artificial intelligence module if the recognition target object is determined,
wherein the fourth step comprises a step of controlling a designated number of object region recognition data to be provided, in a designated order, to a user terminal used by a user who has age information matched with the age relevance to the recognition target object among the U users.

6. The method of claim 1, further comprising steps of:
receiving registered national origin information of the U users and storing the received national origin information in a designated management DB, and
determining national origin relevance to a recognition target object to be recognized through the artificial intelligence module if the recognition target object is determined,
wherein the fourth step comprises a step of controlling a designated number of object region recognition data to be provided, in a designated order, to a user terminal used by a user who has country of origin information matched with the national origin relevance to the recognition target object among the U users.

7. The method of claim 1, further comprising steps of:
receiving registered professional field information of the U users and storing the received professional field information in a designated management DB, and
determining professional field relevance to a recognition target object to be recognized through the artificial intelligence module if the recognition target object is determined,
wherein the fourth step comprises a step of controlling a designated number of object region recognition data to be provided, in a designated order, to a user terminal used by a user who has professional field information matched with the professional field relevance to the recognition target object among the U users.

8. The method of claim 1, further comprising steps of:
obtaining at least one piece of location-related information among pieces of information on a country, an area and a location where a user terminal accessed over a communication network is placed; and
checking two or more user terminals, belonging to a designated boundary range or distance range, by reading location-related information of user terminals which are to be provided with object region recognition data of an identical recognition target object in an identical time zone,
wherein the fourth step comprises a step of controlling the object region recognition data of the recognition target object to be provided, in different orders in which the object region recognition data does not overlap, to two or more user terminals belonging to a designated boundary range or distance range, if the two or more user terminals are checked.

9. The method of claim 1, wherein the fourth step further comprises a step of
controlling a reference object image, comprising the structured image of the recognition target object, to be displayed in a given region of a screen identical with a screen on which the object region recognition data is displayed, by providing the user terminal with the reference object image.

10. The method of claim 1, wherein the designated ratio comprises at least one of ratios of 51/100 to 100/100.

11. The method of claim 1, wherein the fifth step further comprises a step of increasing an incentive score for providing a designated incentive to a user who has selected an effective object region identical with effective object regions selected by a designated ratio or more of users for each object region selection data.

12. The method of claim 1, wherein the fifth step further comprises a step of increasing a penalty score for providing a designated penalty to a user who has selected an effective object region different from effective object regions selected by a designated ratio or more of users for each object region selection data.

13. A method of improving reliability of artificial intelligence-based object recognition using collective intelligence-based mutual verification, the method executed by a server operating in conjunction with an artificial intelligence module and comprising:
a first step of training the artificial intelligence module by inputting, to the artificial intelligence module, M (M≥2) structured data corresponding to a structured image of a recognition target object to be recognized through the artificial intelligence module;
a second step of preparing N (N≥2) learning data comprising one or more of the structured image and unstructured image of the recognition target object;
a third step of recognizing one or more object regions included in the N learning data and extracting N object region recognition data in which the recognized object regions have been set on the N learning data;
a fourth step of performing, on designated u (1≤u≤U) users for a given time, a procedure of providing, in a designated order, ni (1≤ni≤N) object region recognition data to an i-th user terminal used by an i-th (1≤i≤U) user among U (U≥2) users and receiving, from the i-th user terminal, ni object region selection data comprising at least one effective object region corresponding to the recognition target object and selected among one or more object regions included in the ni object region recognition data, and a procedure of providing, in a designated order, nj (1≤nj≤N) object region recognition data to a j-th user terminal used by a j-th (1≤j≤U, i≠j) user and receiving, from the j-th user terminal, nj object region selection data comprising at least one effective object region corresponding to the recognition target object and selected among one or more object regions included in the nj object region recognition data;

a fifth step of determining n learning data, which is to be input to and learnt by the artificial intelligence module in order to improve reliability of the artificial intelligence module, by performing a collective intelligence-based mutual verification procedure of selecting n (1≤n≤N) object region selection data comprising an identical effective object region selected by a designated ratio or more of users among v (1≤v≤u) users who have selected effective object regions for each object region selection data by mutually comparing and analyzing object region selection data of respective u users, received from the u user terminals, for each identical object region selection data; and a sixth step of training the artificial intelligence module by inputting the determined n learning data to the artificial intelligence module, wherein the method further comprising steps of:

receiving registered religion information of the U users and storing the received religion information in a designated management DB, and determining religion relevance to a recognition target object to be recognized through the artificial intelligence module if the recognition target object is determined, wherein the fourth step comprises a step of controlling a designated number of object region recognition data to be provided, in a designated order, to a user terminal used by a user who has religion information matched with the religion relevance to the recognition target object among the U users.

14. A method of improving reliability of artificial intelligence-based object recognition using collective intelligence-based mutual verification, the method executed by a server operating in conjunction with an artificial intelligence module and comprising:

a first step of training the artificial intelligence module by inputting, to the artificial intelligence module, M (M≥2) structured data corresponding to a structured image of a recognition target object to be recognized through the artificial intelligence module;

a second step of preparing N (N≥2) learning data comprising one or more of the structured image and unstructured image of the recognition target object;

a third step of recognizing one or more object regions included in the N learning data and extracting N object region recognition data in which the recognized object regions have been set on the N learning data;

a fourth step of performing, on designated u (1≤u≤U) users for a given time, a procedure of providing, in a designated order, ni (1≤ni≤N) object region recognition data to an i-th user terminal used by an i-th (1≤i≤U) user among U (U≥2) users and receiving, from the i-th user terminal, ni object region selection data comprising at least one effective object region corresponding to the recognition target object and selected among one or more object regions included in the ni object region recognition data, and a procedure of providing, in a designated order, nj (1≤nj≤N) object region recognition data to a j-th user terminal used by a j-th (1≤j≤U, i≠j) user and receiving, from the j-th user terminal, nj object region selection data comprising at least one effective object region corresponding to the recognition target object and selected among one or more object regions included in the nj object region recognition data;

a fifth step of determining n learning data, which is to be input to and learnt by the artificial intelligence module in order to improve reliability of the artificial intelligence module, by performing a collective intelligence-based mutual verification procedure of selecting n (1≤n≤N) object region selection data comprising an identical effective object region selected by a designated ratio or more of users among v (1≤v≤u) users who have selected effective object regions for each object region selection data by mutually comparing and analyzing object region selection data of respective u users, received from the u user terminals, for each identical object region selection data; and a sixth step of training the artificial intelligence module by inputting the determined n learning data to the artificial intelligence module, wherein the method further comprising steps of:

obtaining at least one piece of location-related information among pieces of information on a country, an area and a location where a user terminal accessed over a communication network is placed; and checking two or more user terminals, belonging to a designated boundary range or distance range, by reading the location-related information of user terminals accessed in an identical time zone, wherein the fourth step comprises a step of controlling object region recognition data of different recognition target objects to be provided, in a designated order, to two or more user terminals belonging to the designated boundary range or distance range, if the two or more user terminals are checked.

* * * * *